United States Patent
Zhang et al.

(10) Patent No.: US 11,122,127 B2
(45) Date of Patent: Sep. 14, 2021

(54) TECHNIQUES AND APPARATUSES FOR MODEM-ASSISTED HEARTBEAT TRANSMISSION

(71) Applicant: QUALCOMM Incorporated, San Diego, CA (US)

(72) Inventors: Juan Zhang, San Diego, CA (US); Ajith Payyappilly, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 15/971,754

(22) Filed: May 4, 2018

(65) Prior Publication Data
US 2019/0068721 A1   Feb. 28, 2019

Related U.S. Application Data

(60) Provisional application No. 62/551,104, filed on Aug. 28, 2017.

(51) Int. Cl.
*H04L 29/08* (2006.01)
*H04W 76/25* (2018.01)
(Continued)

(52) U.S. Cl.
CPC ........ *H04L 67/145* (2013.01); *H04L 43/0811* (2013.01); *H04L 43/10* (2013.01);
(Continued)

(58) Field of Classification Search
CPC ..... H04L 43/10; H04L 61/2553; H04L 69/16; H04L 69/165; H04L 69/28; H04L 67/145; H04L 67/26
See application file for complete search history.

(56) References Cited

U.S. PATENT DOCUMENTS

| | | | |
|---|---|---|---|
| 7,768,939 B1 * | 8/2010 | Trivedi | H04L 43/10 370/252 |
| 8,326,985 B2 | 12/2012 | Luna et al. | |

(Continued)

OTHER PUBLICATIONS

International Search Report and Written Opinion—PCT/US2018/043450—ISA/EPO—dated Nov. 6, 2018.

*Primary Examiner* — Jeong S Park
(74) *Attorney, Agent, or Firm* — QUALCOMM Incorporated

(57) ABSTRACT

Certain aspects of the present disclosure generally relate to wireless communication. In some aspects, a modem of a user equipment (UE) may receive one or more parameters that configure the modem to perform a periodic communication to maintain a first connection of the UE; and perform the periodic communication based at least in part on the one or more parameters, wherein the periodic communication is performed on a second connection different than the first connection. In some aspects, an application processor of a UE may establish a connection with a server for a plurality of applications, the server to be configured to communicate with respective application servers for the plurality of applications; configure a modem of the UE to perform a periodic communication to maintain the connection; and provide a push notification, received via the connection and associated with an application of the plurality of applications, to the application.

16 Claims, 10 Drawing Sheets

(51) Int. Cl.
  *H04L 29/06*   (2006.01)
  *H04L 12/26*   (2006.01)
  *H04W 52/02*   (2009.01)
  *H04W 88/02*   (2009.01)
  *H04W 28/06*   (2009.01)

(52) U.S. Cl.
  CPC .............. *H04L 67/26* (2013.01); *H04L 67/34* (2013.01); *H04L 69/165* (2013.01); *H04L 69/28* (2013.01); *H04W 52/0206* (2013.01); *H04W 52/0222* (2013.01); *H04W 76/25* (2018.02); *H04W 88/02* (2013.01); *H04W 28/06* (2013.01)

(56) References Cited

U.S. PATENT DOCUMENTS

| | | |
|---|---|---|
| 8,812,695 B2 | 8/2014 | Luna et al. |
| 9,560,086 B2 | 1/2017 | Undery et al. |
| 2004/0120294 A1* | 6/2004 | Yang .................... H04L 61/2084 370/338 |
| 2007/0140159 A1* | 6/2007 | Eronen ................. H04L 69/165 370/328 |
| 2009/0067407 A1* | 3/2009 | Jia .......................... H04L 12/189 370/350 |
| 2009/0319670 A1* | 12/2009 | Kang .................... H04L 67/145 709/227 |
| 2011/0213820 A1* | 9/2011 | Morris .................... H04L 69/16 709/201 |
| 2012/0117401 A1* | 5/2012 | Gobriel ............. H04W 52/0209 713/320 |
| 2012/0131663 A1* | 5/2012 | Anchan ............. H04L 29/12471 726/13 |
| 2012/0188928 A1 | 7/2012 | Wang et al. |
| 2013/0031191 A1 | 1/2013 | Bott |
| 2014/0066063 A1* | 3/2014 | Park ....................... H04W 4/12 455/435.1 |
| 2014/0211764 A1 | 7/2014 | Sundararajan et al. |
| 2015/0121100 A1 | 4/2015 | Peng et al. |
| 2018/0227372 A1* | 8/2018 | Sharma ................. H04L 69/165 |

* cited by examiner

TECHNIQUES AND APPARATUSES FOR MODEM-ASSISTED HEARTBEAT TRANSMISSION

CROSS-REFERENCE TO RELATED APPLICATIONS UNDER 35 U.S.C. § 119

This application claims priority to Provisional Patent Application No. 62/551,104, filed on Aug. 28, 2017, entitled "TECHNIQUES AND APPARATUSES FOR MODEM-ASSISTED HEARTBEAT TRANSMISSION," which is hereby expressly incorporated by reference herein.

FIELD OF THE DISCLOSURE

Aspects of the present disclosure generally relate to wireless communication, and more particularly to techniques and apparatuses for modem-assisted heartbeat transmission.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communication performed by a modem of a user equipment (UE) may include receiving one or more parameters relating to a periodic communication to maintain a first connection of the UE, and performing the periodic communication based at least in part on the one or more parameters, wherein the periodic communication is performed on a second connection different than the first connection.

In some aspects, a modem of a user equipment for wireless communication may include memory and one or more processors operatively coupled to the memory. The memory and the one or more processors may be configured to receive one or more parameters relating to a periodic communication to maintain a first connection of the UE, and perform the periodic communication based at least in part on the one or more parameters, wherein the periodic communication is performed on a second connection different than the first connection.

In some aspects, a non-transitory computer-readable medium may store one or more instructions for wireless communication. The one or more instructions, when executed by one or more processors of a modem of a UE, may cause the one or more processors to receive one or more parameters relating to a periodic communication to maintain a first connection of the UE, and perform the periodic communication based at least in part on the one or more parameters, wherein the periodic communication is performed on a second connection different than the first connection.

In some aspects, an apparatus for wireless communication may include means for receiving one or more parameters relating to a periodic communication to maintain a first connection of the apparatus, and performing the periodic communication based at least in part on the one or more parameters, wherein the periodic communication is performed on a second connection different than the first connection.

In some aspects, a method for wireless communication performed by an application processor of a UE may include establishing a connection with a server for a plurality of applications, the server to be configured to communicate with respective application servers for the plurality of applications, configuring a modem of the UE to perform a periodic communication to maintain the connection, and providing a push notification, received via the connection and associated with an application of the plurality of applications, to the application.

In some aspects, an application processor of a UE for wireless communication may include memory and one or more processors operatively coupled to the memory. The memory and the one or more processors may be configured to establish a connection with a server for a plurality of applications, the server to be configured to communicate with respective application servers for the plurality of applications, configure a modem of the UE to perform a periodic communication to maintain the connection, and provide a push notification, received via the connection and associated with an application of the plurality of applications, to the application.

In some aspects, a non-transitory computer-readable medium may store one or more instructions for wireless communication. The one or more instructions, when executed by one or more processors of a user equipment, may cause the one or more processors to establish a connection with a server for a plurality of applications, the server to be configured to communicate with respective application servers for the plurality of applications, configure a modem of the UE to perform a periodic communication to maintain the connection, and provide a push notification, received via the connection and associated with an application of the plurality of applications, to the application.

In some aspects, an apparatus for wireless communication may include means for establishing a connection with a server for a plurality of applications, the server to be configured to communicate with respective application servers for the plurality of applications, means for configuring a modem of the apparatus to perform a periodic communication to maintain the connection, and means for providing a push notification, received via the connection and associated with an application of the plurality of applications, to the application.

Aspects generally include a method, apparatus, system, computer program product, non-transitory computer-readable medium, user equipment, wireless communication device, server, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
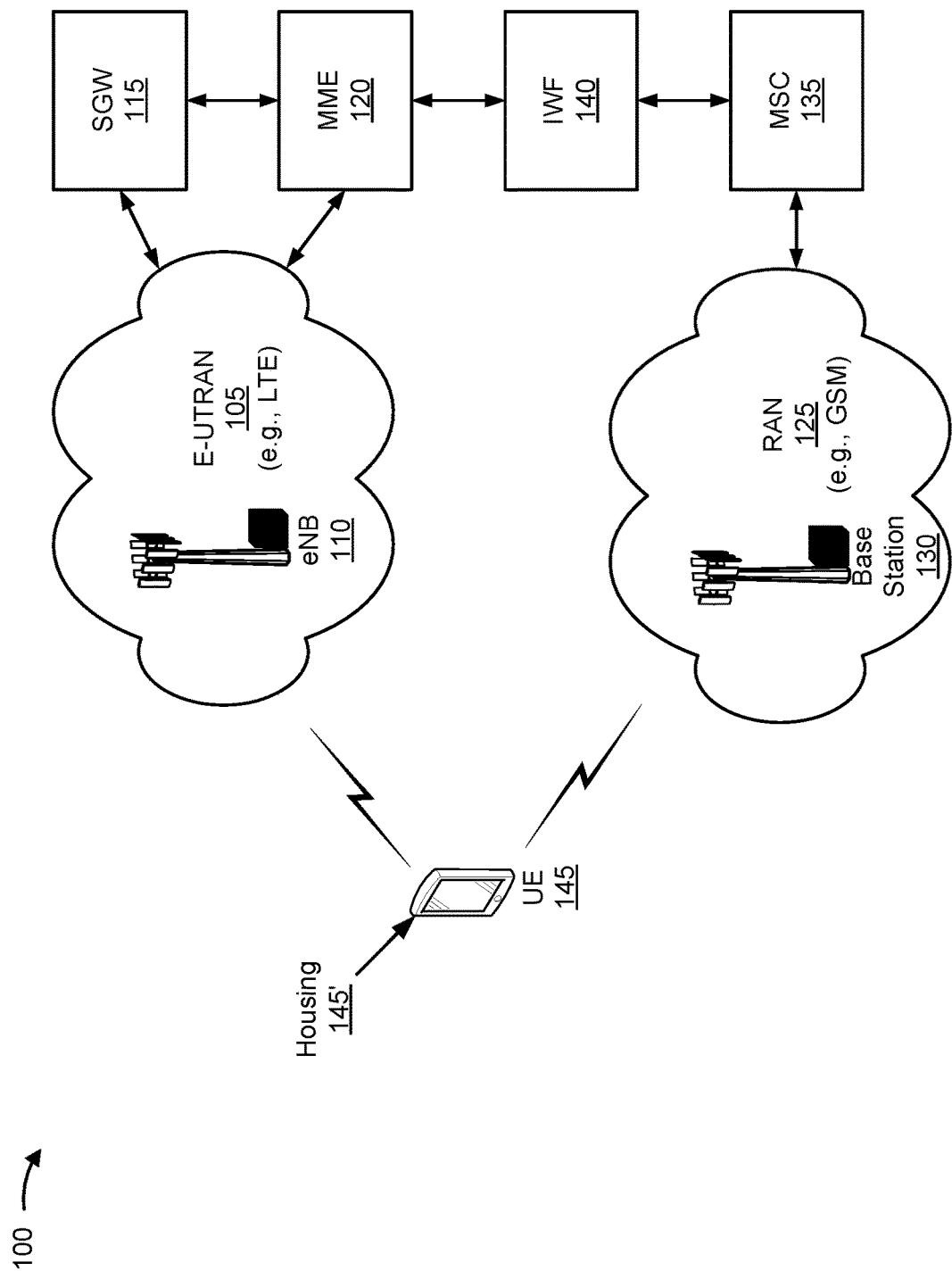
FIG. 1 is a diagram illustrating an example deployment in which multiple wireless networks have overlapping coverage, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1×radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFTs-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP Technical Specification 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
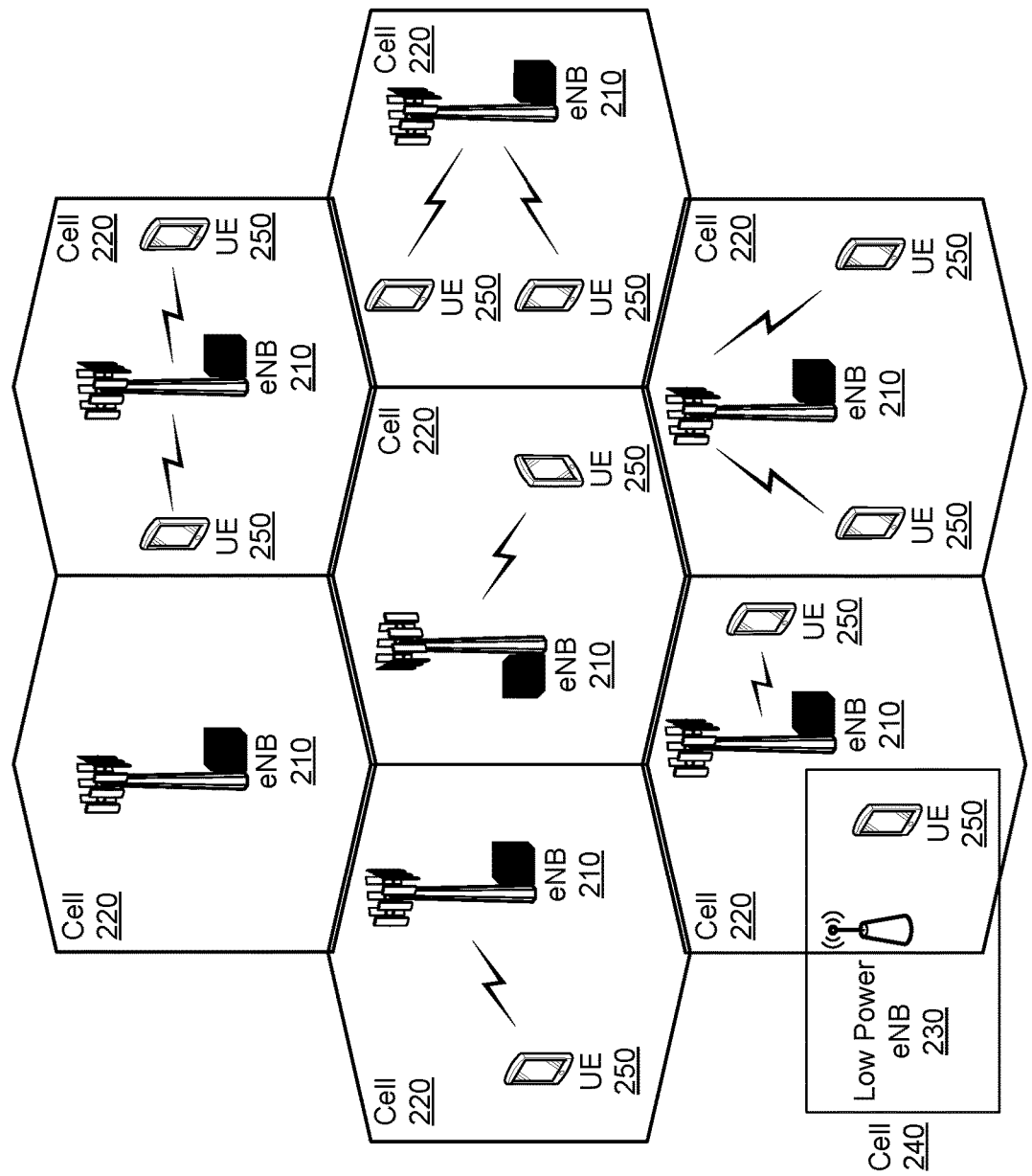
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
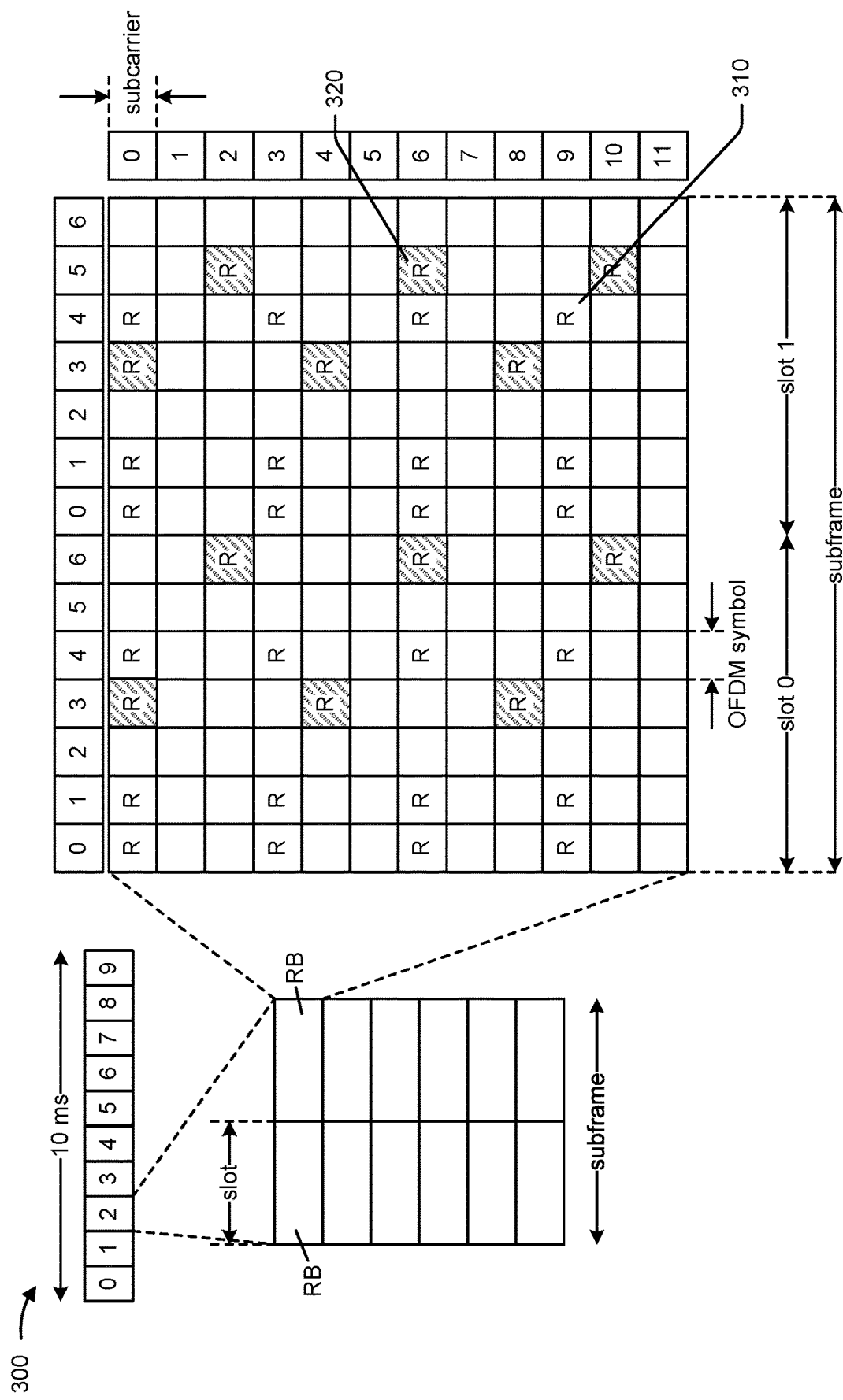
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
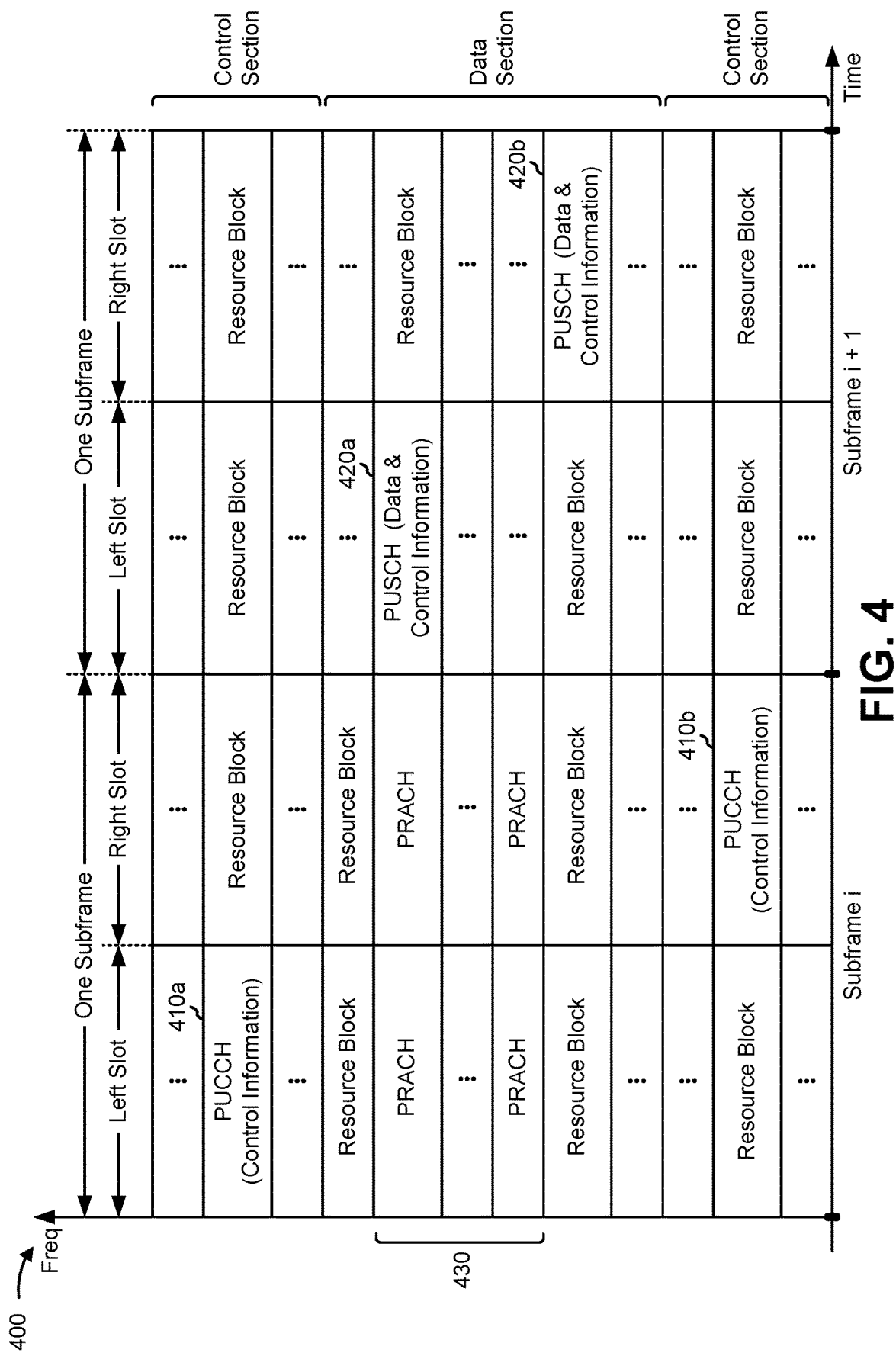
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
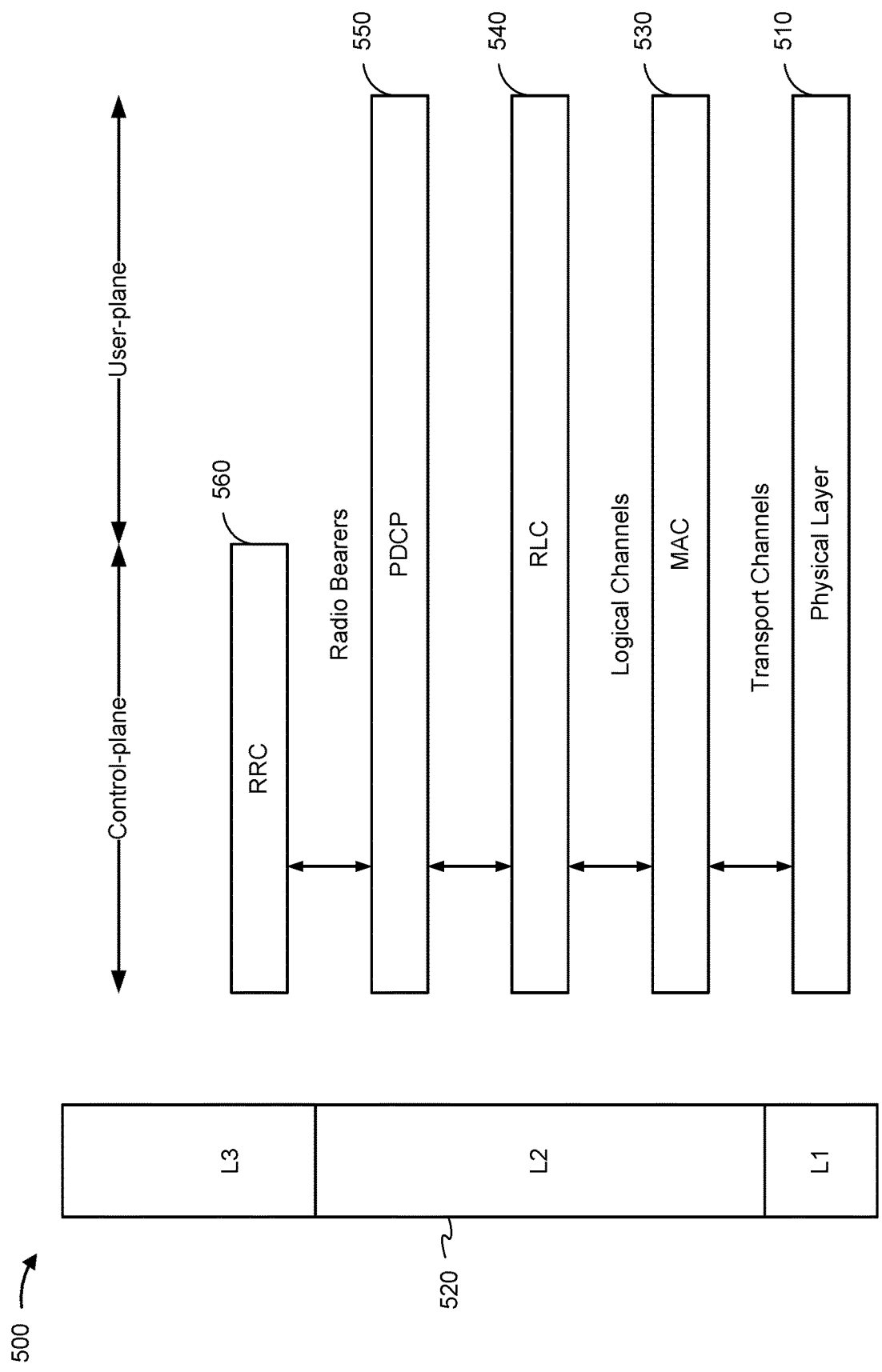
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
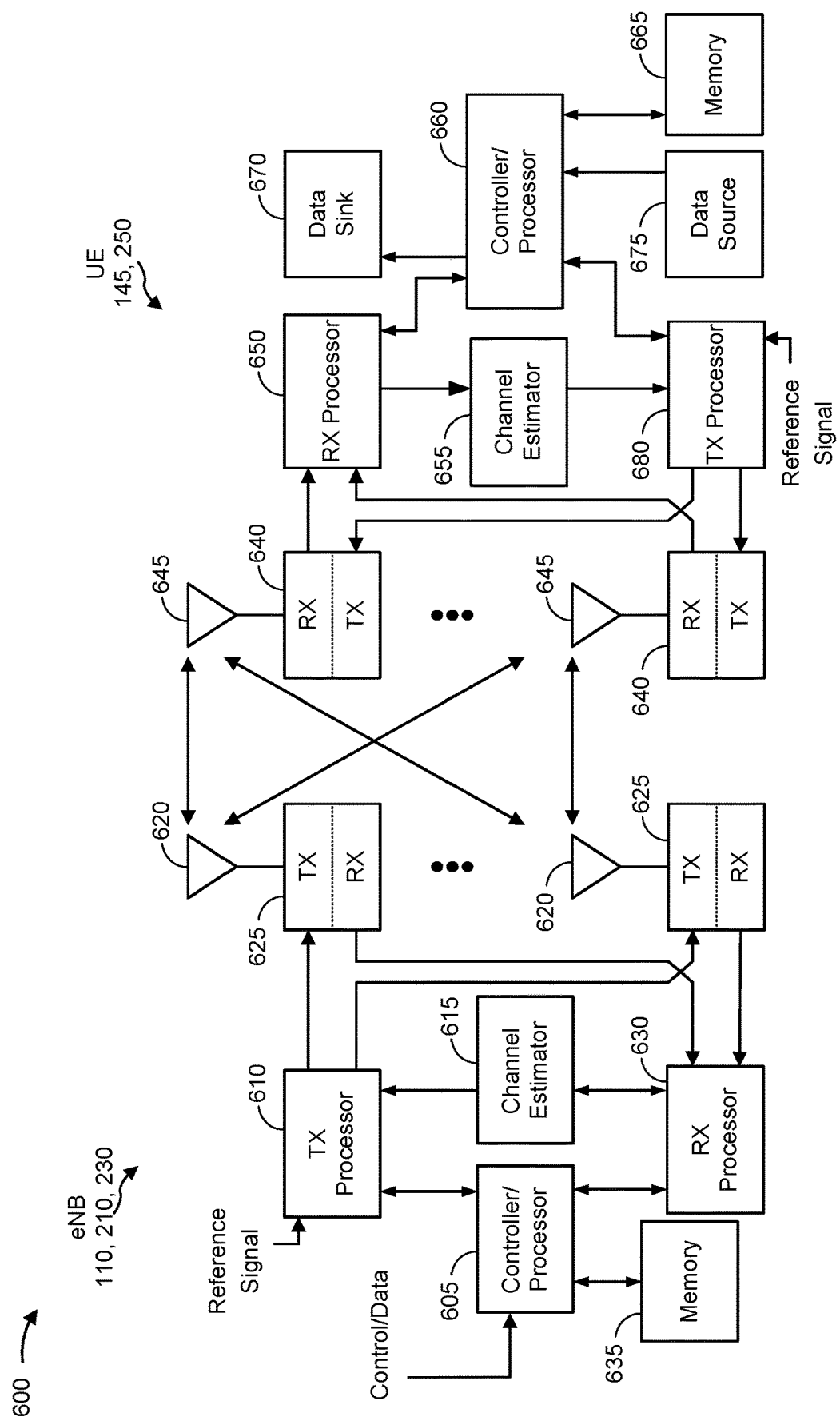
FIG. 6 is a diagram illustrating example components of an evolved Node B and a user equipment in an access network, in accordance with various aspects of the present disclosure.

FIG. 6 is a diagram illustrating example components 600 of a base station such as an eNB 110, 210, 230 and a UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates a radio frequency (RF) carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receive (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. One or more components of UE 145, 250 may be configured to perform modem-assisted heartbeat transmission, as described in more detail elsewhere herein. For example, the controller/processor 660 and/or other processors and modules of UE 145, 250 may perform or direct operations of, for example, one or more processes described herein. In some aspects, one or more of the components shown in FIG. 6 may be employed to perform one or more processes for the techniques described herein. In some aspects, one or more of the components shown in FIG. 6 may act as means for performing one or more operations associated with modem-assisted heartbeat transmission.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

A first device, such as a user equipment (UE), may communicate with a second device using data transmitted via a connection. Some connections may be ended after a particular length of time in which no data is transmitted via the connection. For example, a Transport Control Protocol (TCP) connection may be associated with an inactivity timer, and the TCP connection may be ended or torn down when the inactivity timer expires. In some cases, it may be beneficial to keep the TCP connection alive. For example, if an application of a UE desires low-latency communications or notifications, it may be beneficial to keep a TCP connection of the application alive for the low-latency communications or notifications. In such a case, the UE may transmit a periodic communication, which may be termed a heartbeat communication or keepalive message, so that the inactivity timer does not expire.

In some cases, a UE may use multiple, different applications that use respective connections for communication with respective application servers. In such a case, each application may be associated with a respective heartbeat transmission to keep the respective connections alive. However, it may be wasteful to use multiple heartbeat transmissions to preserve multiple connections for the multiple, different applications. For example, an application processor of the UE may need to awaken each time any heartbeat transmission is to be sent, which may use battery power and other resources of the UE. Furthermore, some heartbeat transmissions may not align with each other, which may lead to even more frequent wakeup of the application processor.

Some techniques and apparatuses described herein may configure a modem of a UE to perform a heartbeat transmission for a single connection (e.g., a TCP connection) that is used for all of the one or more applications running on an application processor of the UE. For example, a push agent of the UE (e.g., associated with an application processor of the UE) may establish a connection (e.g., TCP connection and/or the like) with a remote server, referred to herein as a push server. The push agent may configure a modem of the UE (e.g., a heartbeat agent of the modem) to perform a periodic communication to keep the connection alive. In some aspects, the periodic communication may be performed via a different connection than the connection associated with the one or more applications, such as a User Datagram Protocol (UDP) connection, which simplifies implementation of the heartbeat agent and reduces wasteful usage of the TCP connection and/or awakening of the application processor for this purpose. In some aspects, the push agent, which may be resident in the application processor, may provide data (e.g., notifications or other data), received via the connection, to the applications. Furthermore, the push server may handle routing of traffic to and from application servers associated with the applications.

In this way, a number of active data connections for a plurality of applications is reduced. Furthermore, heartbeat transmissions of the UE may be reduced to a single heartbeat transmission (e.g., via a connection other than a data connection or TCP connection of the UE), which conserves battery and radio resources of the UE. Still further, notifications and other data traffic to and/or from the applications are handled by a push agent, which enables the usage of a single connection for the applications. Thus, battery and radio performance of the UE is improved and usage of the air interface is reduced.

Figure 7:
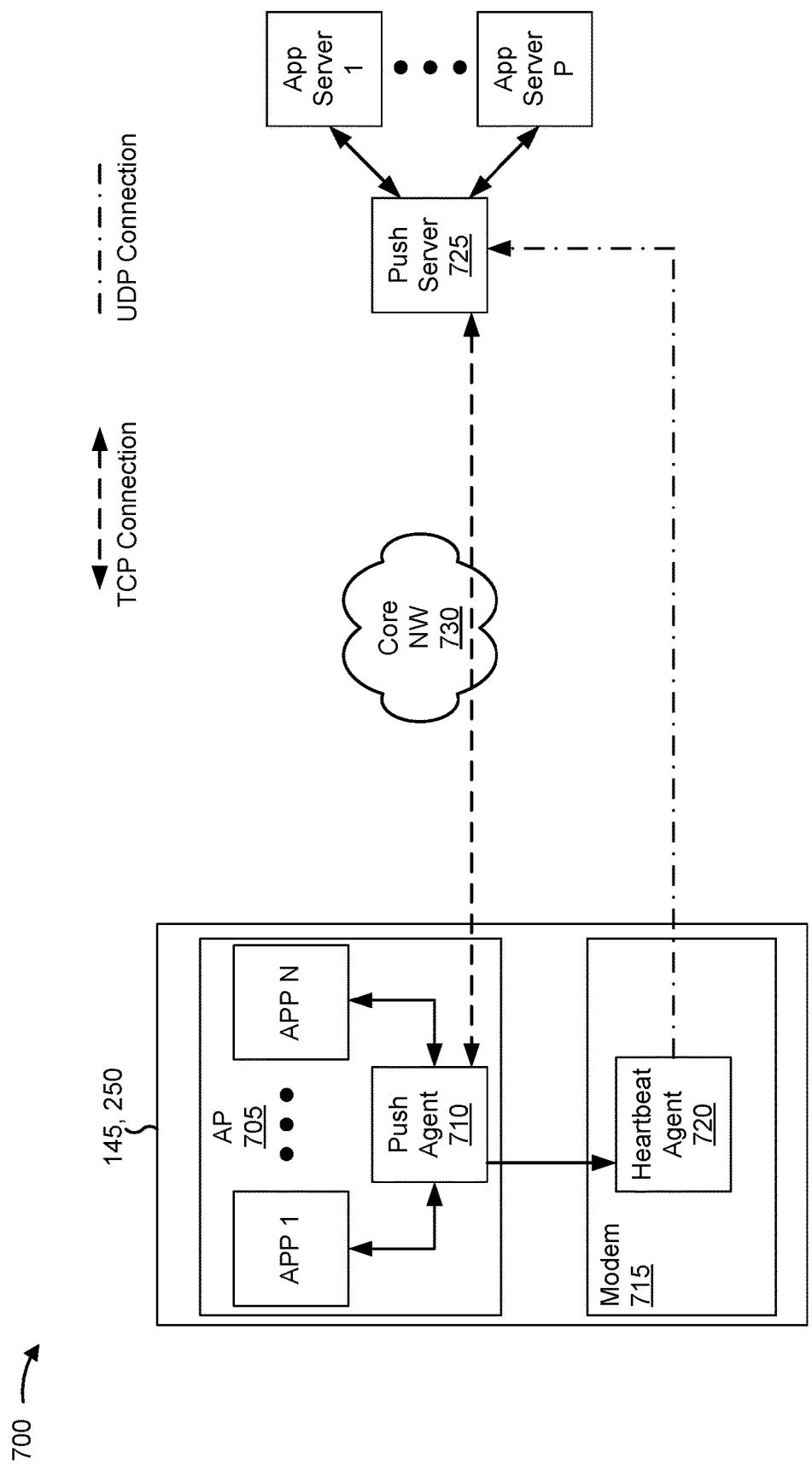
FIG. 7 is a diagram illustrating an example of a push agent and a heartbeat agent for keeping an application connection alive, in accordance with various aspects of the present disclosure.

FIG. 7 is a diagram illustrating an example 700 of a push agent and a heartbeat agent for keeping an application connection alive, in accordance with various aspects of the present disclosure. As shown in FIG. 7, a UE 145, 250 may include an application processor (AP) 705. In some aspects, the AP 705 may include, for example, controller/processor 660 and/or the like. As shown, the AP 705 may be associated with applications (APPs) 1 through N, wherein N is zero or more. In some cases, an application may be associated with a connection with a remote server (shown in FIG. 7 as an APP server 1 through P (where P is zero or more and may or may not be equal to N)). For example, the application may be associated with a TCP connection, an IP connection, and/or the like. Some connections may require that some communication occur within an interval that is defined by an inactivity timer. When the inactivity timer expires without communication, the connection between the application and the application server may be ended. To prevent this, the UE 145, 250 may transmit periodic communications sometimes referred to as heartbeat transmissions. However, in the case when the AP 705 is associated with multiple applications, it may be wasteful of resources of the AP 705 to awaken each time a heartbeat transmission is to be transmitted for any of the multiple applications.

As shown, the AP 705 may be associated with a push agent 710, which may be referred to in some cases as an entity of the AP 705. The push agent 710 may handle uplink and/or downlink communications between the applications and the application servers. As further shown, the push agent 710 may be associated with a TCP connection to a push server 725 (described in more detail below). In some aspects, the push agent 710 may forward or provide traffic from an application server to an application (e.g., an application package). As shown, the push agent 710 may communicate with a modem 715 of the UE 145, 250 (e.g., TX/RX 640, RX processor 650, TX processor 680, etc.) that may include a heartbeat agent 720, which is described in more detail below.

In some aspects, the push agent 710 may determine a periodicity for a heartbeat transmission to be performed by the heartbeat agent 720. Additionally, or alternatively, the push agent 710 may use a preconfigured value for the periodicity of the heartbeat transmission. For example, the periodicity for the heartbeat transmission may be configured so that the inactivity timer associated with the TCP connection between the push agent 710 and the push server 725 does not expire. The push agent 710 may configure the heartbeat agent 720 to perform the heartbeat transmission according to the periodicity, as described in more detail below.

In some aspects, the push agent 710 may determine a payload for a heartbeat transmission. For example, the payload may include any information to be provided to the push server or the application server. For example, the payload may include information generated by an application or information generated by the push agent 710. As another example, the payload may include information to keep alive a connection between an application and an application server (e.g., another heartbeat transmission, a keepalive message, etc.). As yet another example, the payload may include an acknowledgment and/or the like for an application server. In some aspects, the payload may be transparent to the modem (e.g., using a RRC transparent container, and/or the like) which improves security of the payload and efficiency of transmission of the payload. In some aspects, the payload may be plain text, or may be encrypted. The payload can use any format.

As shown, the modem 715 may be associated with a heartbeat agent 720. The heartbeat agent 720 may perform a transmission of a heartbeat transmission to the push server 725 with a particular periodicity. For example, the push agent 710 may configure the particular periodicity. In some aspects, the heartbeat agent 720 (e.g., the modem 715) may perform the transmission using a UDP connection with the push server 725. This may conserve resources of the TCP connection, and may simplify implementation of the heartbeat agent 720. For example, the modem 715 may be associated with a different TCP/IP stack than the AP 705, so using the UDP connection separately from the TCP connection may simplify implementation of the heartbeat transmission in comparison to using the TCP connection for the modem 715 and the push agent 710.

The push server 725 may communicate with the push agent 710, the heartbeat agent 720, and/or the application servers 1 through P. In some aspects, the push server 725 may receive information from an application server, may determine that the information is destined for an application associated with the UE 145, 250 (or that the information is destined for the UE 145, 250), and may provide the information to the UE 145, 250 via the TCP connection. In some aspects, the push server 725 may receive a heartbeat transmission from the heartbeat agent 720 via the UDP connection, and may maintain the TCP connection in connection with receiving the heartbeat transmission.

In some aspects, the push server 725 may receive a payload in a heartbeat transmission. In such a case, the push server 725 may perform an action based at least in part on receiving the payload. As one example, the push server 725 may forward the payload to an application server. As another example, the push server 725 may provide other information to an application server. As yet another example, the push server 725 may provide a heartbeat transmission or keepalive message to an application server on behalf of an application. This may keep a session between the application and the application server alive, thereby eliminating the need for the AP 705 to wake up for heartbeat transmissions for each application.

As shown, the push agent 710 and the push server 725 may communicate via a core network (NW) 730 (e.g., via the TCP connection). For example, the core network 730 may include any of the network devices or components described in connection with FIGS. 1 and 2. In some aspects, the heartbeat agent 720 and the push server 725 may communicate via the core network 730 (e.g., via the UDP connection). In some aspects, the heartbeat agent 720 and the push server 725 may not communicate via the core network 730.

As indicated above, FIG. 7 is provided as an example. Other examples are possible and may differ from what was described with regard to FIG. 7.

Figure 8:
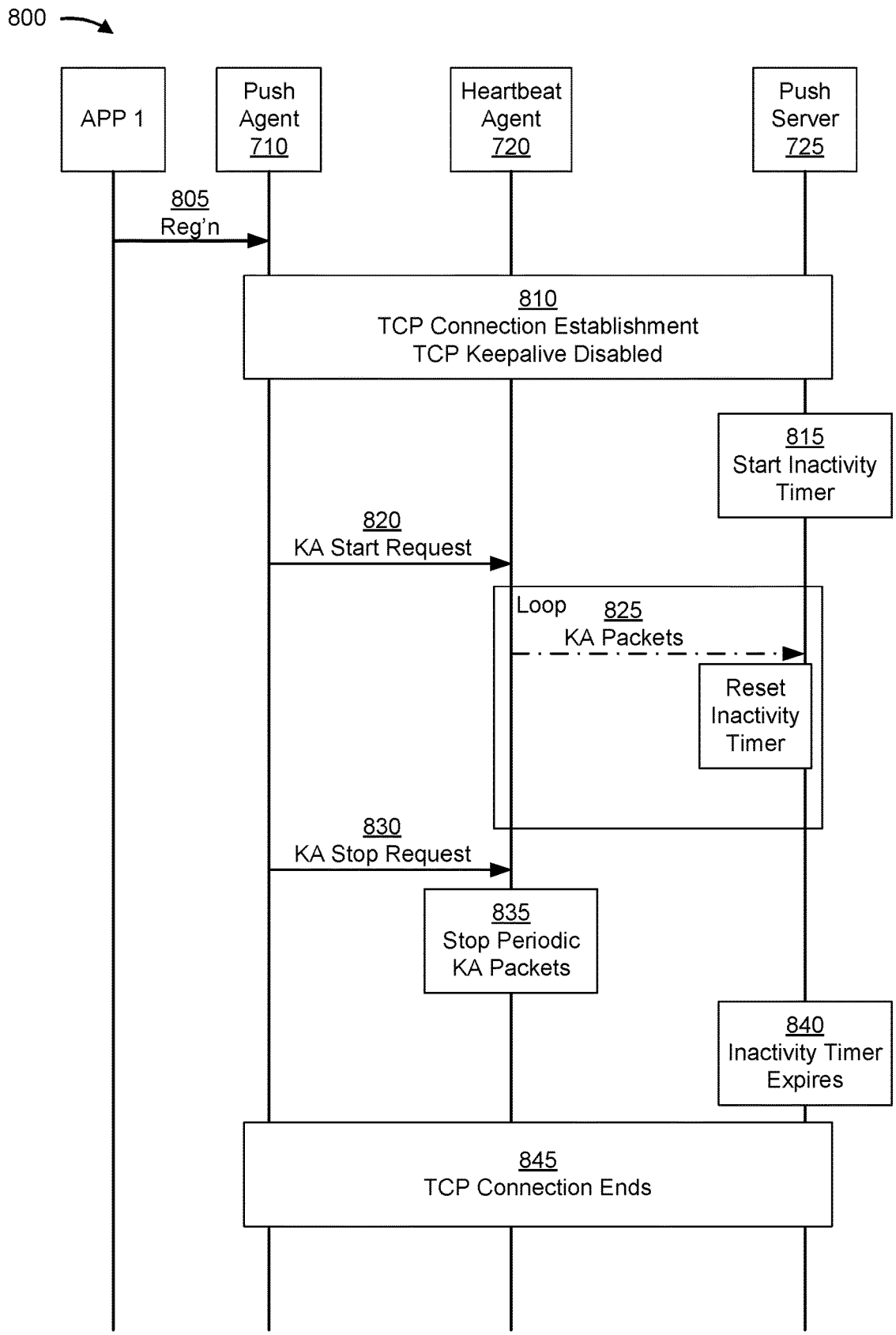
FIG. 8 is a diagram illustrating an example call flow for communication between a push agent, a heartbeat agent, and a push server, in accordance with various aspects of the present disclosure.

FIG. 8 is a diagram illustrating an example call flow 800 for communication between a push agent, a heartbeat agent, and a push server, in accordance with various aspects of the present disclosure. As shown in FIG. 8, and by reference number 805, an application may perform registration with a push agent 710. For example, the application may provide information identifying the application (e.g., a unique identifier of the application, an application-layer address for the application, contact information for the application, a data format for information to be received by the application, etc.). In some aspects, the application may provide information indicating that the application is to be associated with the heartbeat transmission by the modem 715. For example, the application may provide an indication that a separate TCP session for the application is not to be established between the AP 705 and a corresponding application server. This may conserve resources of the AP 705 and the corresponding application server that would otherwise be used to establish and maintain such a connection.

As shown by reference number 810, the push agent 710 may establish a first connection (e.g., a TCP connection) with a push server 725. As shown by reference number 815, the push server 725 may start an inactivity timer for the first connection. The first connection may be for communications between the applications and corresponding application servers. For example, the push server 725 may route downlink communications (e.g., push notifications or other information) from an application server to an application via the first connection. In some aspects, the push server 725 may route uplink communications from the application to the application server via the first connection. Additionally, or alternatively, the push server 725 may receive uplink communications as a payload in a heartbeat transmission via a second connection (e.g., a UDP connection), and may route the uplink communications from the application to the application server. In some aspects, the push server 725 may provide information, to the push agent 710, indicating a length of the inactivity timer. The push agent 710 may use this information to determine a length of a periodicity of a heartbeat transmission for the heartbeat agent 720.

As further shown, a TCP keepalive service of the AP 705 may be disabled for the first connection (e.g., the TCP connection). This may conserve resources of the AP 705 that would otherwise be used to awaken and perform a heartbeat transmission for the first connection. For example, by configuring the heartbeat agent 720 of the modem 715 to perform the heartbeat transmission, the AP 705 may be able to remain asleep while the heartbeat agent 720 performs a single heartbeat transmission for a single first connection, rather than waking up to perform heartbeat transmissions for each application's respective connection.

As shown by reference number 820, the push agent 710 may provide a keepalive start request to the heartbeat agent 720. The keepalive start request may identify one or more parameters relating to the heartbeat transmission. In some aspects, the heartbeat transmission may be referred to herein as a periodic communication. The one or more parameters may include, for example, a source address (e.g., of the UE 145, 250, the AP 705, the push agent 710, or the heartbeat agent 720), a source port identifier (e.g., of the UE 145, 250, the AP 705, the push agent 710, or the heartbeat agent 720), a destination address (e.g., of the UE 145, 250, the AP 705, the push agent 710, or the heartbeat agent 720), a destination port identifier (e.g., of the UE 145, 250, the AP 705, the push agent 710, or the heartbeat agent 720), a periodicity of the heartbeat transmission, and/or the like.

In some aspects, the push agent 710 may provide a payload for a heartbeat transmission. In some aspects, the push agent 710 may provide the payload with the keepalive start message. In some aspects, the push agent 710 may provide the payload separately from the keepalive start message (e.g., periodically, on demand, based at least in part on determining that a payload is to be provided with the heartbeat transmission, when the payload has changed after the keepalive start message, etc.). In some aspects, the push agent 710 may encrypt the payload. In some aspects, the push agent 710 may package the payload in a container that is transparent to the modem 715, such as an RRC transparent container and/or the like.

As shown by reference number 825, the heartbeat agent 720 may provide a periodic communication (shown as KA packets, and sometimes referred to herein as a heartbeat transmission) based at least in part on the keepalive start request. For example, the heartbeat agent 720 (and/or the modem 715) may provide the periodic communication at the periodicity specified by the keepalive start request. In some aspects, the keepalive start request may not specify a periodicity. In such a case, the heartbeat agent 720 may provide the periodic communication at a default periodicity, a periodicity indicated by information received from the push server 725, and/or the like. As further shown, the push server 725 may reset the inactivity timer based at least in part on receiving the periodic communication.

As shown, the heartbeat agent 720 may provide the periodic communication, and the push server 725 may reset the inactivity timer, in a loop, until the push agent 710 provides a keepalive stop request (shown by reference number 830) to the heartbeat agent 720. For example, the push agent 710 may provide the keepalive stop request based at least in part on determining that the first connection is to be ended. As shown by reference number 835, the heartbeat agent 720 may stop transmitting the periodic communication (e.g., the keepalive packets) based at least in part on the keepalive stop request. In some aspects, the heartbeat agent 720 may stop transmitting the periodic communication without receiving a keepalive stop request. For example, the heartbeat agent 720 may stop transmitting the periodic communication after a particular number of transmissions, after a particular length of time has elapsed, and/or the like.

As shown by reference number 840, the inactivity timer of the push server 725 may expire, since the push server 725 no longer receives the periodic communication. As shown by reference number 845, the push server 725 may end the first connection (e.g., the TCP connection) based at least in part on the inactivity timer expiring. In some aspects, the push server 725 may end the second connection based at least in part on the inactivity timer expiring. In this way, the UE 145, 250 communicates with the push server 725 using a periodic communication, generated by a modem 715 of the UE 145, 250, based at least in part on a configuration provided by a push agent 710 of the UE 145, 250. This reduces frequency of wakeups by an AP 705 of the UE 145, 250, thereby conserving battery power and AP resources. Furthermore, this reduces the number of keepalive transmissions or heartbeat transmissions by the UE 145, 250, thereby improving utilization of air interface resources.

As indicated above, FIG. 8 is provided as an example. Other examples are possible and may differ from what was described with regard to FIG. 8.

Figure 9:
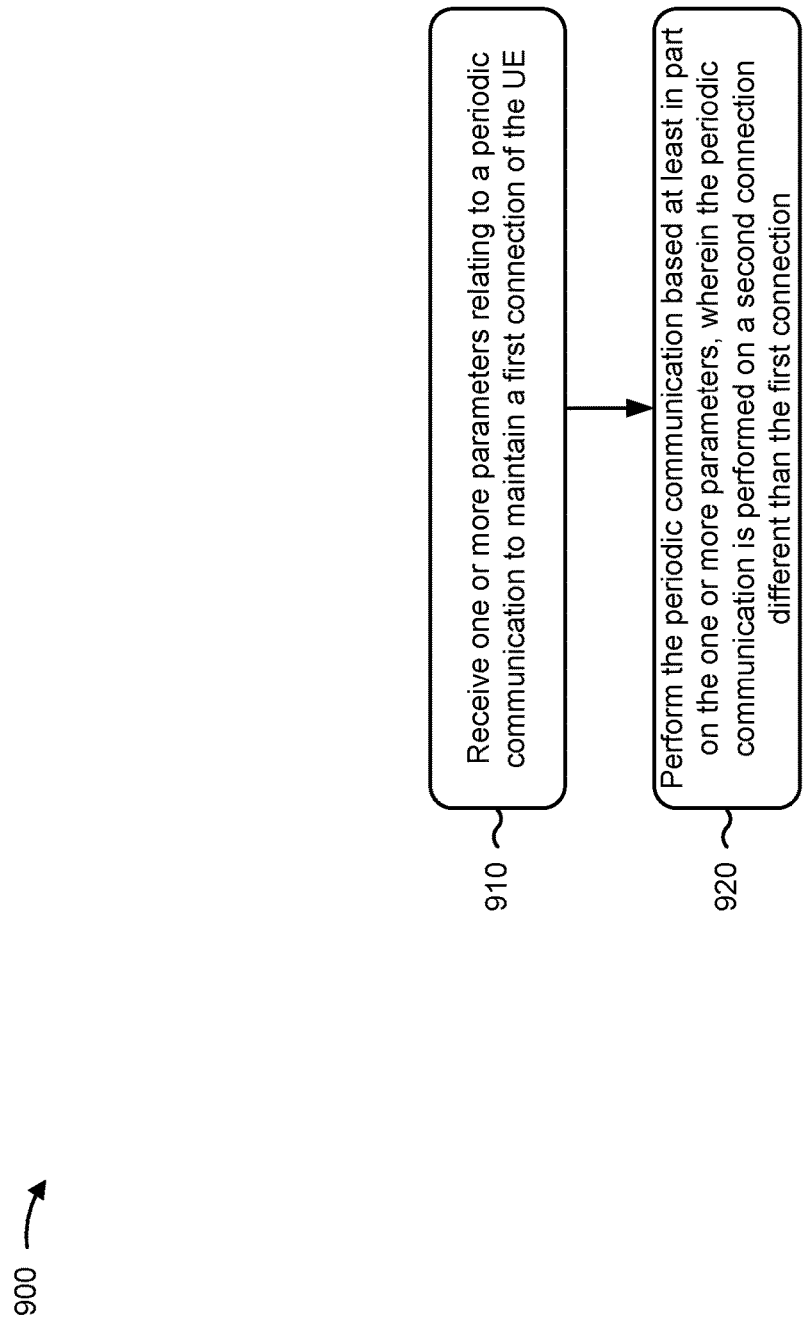
FIG. 9 is a diagram illustrating an example process performed, for example, by a modem of a UE, in accordance with various aspects of the present disclosure.

FIG. 9 is a diagram illustrating an example process 900 performed, for example, by a modem of a UE, in accordance with various aspects of the present disclosure.

As shown in FIG. 9, process 900 may include receiving one or more parameters relating to a periodic communication to maintain a first connection of the UE (block 910). For example, the modem (e.g., the modem 715, the heartbeat agent 720, the RX processor 650, the controller/processor 660, the TX processor 680, the memory 665, the transceiver 640, etc.) may receive one or more parameters. In some aspects, the modem may receive the one or more parameters in a keepalive start request and/or the like. In some aspects, the modem may receive the one or more parameters from an application processor of the UE and/or a push agent of the UE. The one or more parameters may relate to (e.g., may configure the modem to provide) a periodic communication to maintain a first connection of the UE.

As shown in FIG. 9, process 900 may include performing the periodic communication based at least in part on the one or more parameters, wherein the periodic communication is performed on a second connection different than the first connection (block 920). For example, the modem (e.g., the modem 715, the heartbeat agent 720, the RX processor 650, the controller/processor 660, the TX processor 680, the memory 665, the transceiver 640, etc.) may perform (e.g., transmit) the periodic communication (e.g., a keepalive packet, a heartbeat communication, etc.) based at least in part on the one or more parameters. The periodic communication may be performed on a second connection (e.g., a UDP connection) different than the first connection (e.g., a TCP connection).

Process 900 may include additional aspects, such as any single aspect or any combination of aspects described below and/or in connection with one or more other processes described elsewhere herein.

In some aspects, the first connection is a Transport Control Protocol (TCP) connection. In some aspects, the second connection is a User Datagram Protocol (UDP) connection. In some aspects, the one or more parameters are received in a single message.

In some aspects, the modem may receive a stop request message to end the first connection. The modem may cease the periodic communication so that the first connection is ended based at least in part on an inactivity timer. In some aspects, the first connection is for communications between one or more applications of the UE and one or more application servers associated with the one or more applications. In some aspects, the one or more parameters are received from an entity of an application processor of the UE, and the entity may provide notifications to the one or more applications that are received via the first connection.

In some aspects, the first connection is between the UE and a single server. In some aspects, the periodic communication is to prevent lapse of an inactivity timer of the single server for the first connection.

In some aspects, the one or more parameters include information identifying a payload of the periodic communication, and the periodic communication includes the payload. For example, the information identifying the payload may be transparent to the modem. Additionally, or alternatively, the payload may be encrypted.

In some aspects, the one or more parameters relate to an application of the UE, and the one or more parameters identify at least one of a periodicity of the periodic communication, a source network address associated with the application, a destination network address associated with the application, a source port number associated with the application, or a destination port number associated with the application.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
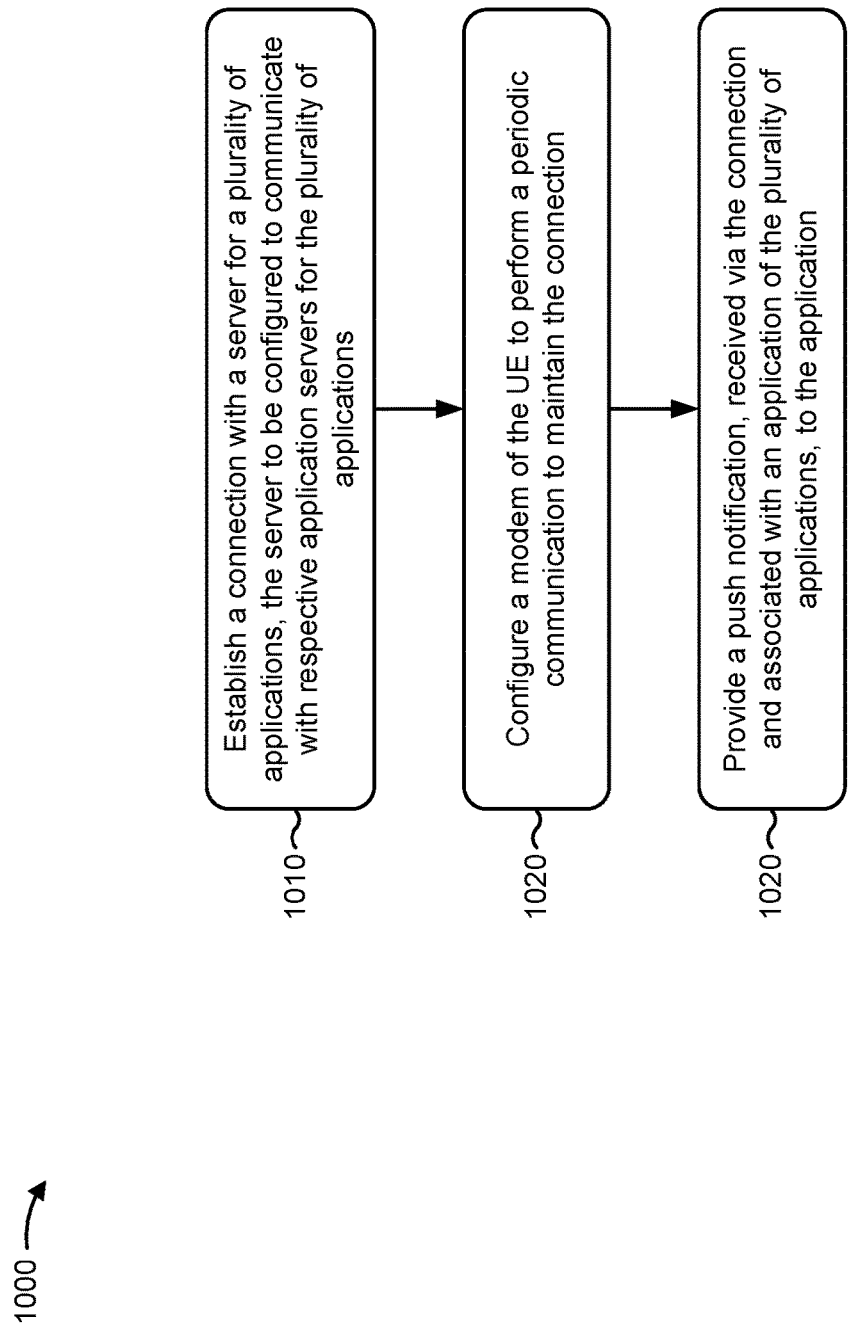
FIG. 10 is a diagram illustrating an example process performed, for example, by an application processor of a UE, in accordance with various aspects of the present disclosure.

FIG. 10 is a diagram illustrating an example process 1000 performed, for example, by an application processor of a UE, in accordance with various aspects of the present disclosure.

As shown in FIG. 10, process 1000 may include establishing a connection with a server for a plurality of applications, the server to be configured to communicate with respective application servers for the plurality of applications (block 1010). For example, the application processor (e.g., the RX processor 650, the controller/processor 660, the TX processor 680, the memory 665, the transceiver 640, etc.) may establish a connection with a server (e.g., a push server 725) for a plurality of applications. In some aspects, the server may be configured to communicate with respective application servers for the plurality of applications. In some aspects, the plurality of applications may be hosted by the application processor.

As shown in FIG. 10, process 1000 may include configuring a modem of the UE to perform a periodic communication to maintain the connection (block 1020). For example, the application processor (e.g., a push agent 710 of the application processor, using the RX processor 650, the controller/processor 660, the TX processor 680, the memory 665, the transceiver 640, etc.) may configure a modem of the UE (e.g., a heartbeat agent 720 of the application processor) to perform a periodic communication. In some aspects, the periodic communication may be used to maintain the connection with the server. In some aspects, the periodic communication may be provided via a different connection than the connection with the server.

As shown in FIG. 10, process 1000 may include providing a push notification, received via the connection and associated with an application of the plurality of applications, to the application (block 1030). For example, the application processor (e.g., a push agent 710 of the application processor, using the RX processor 650, the controller/processor 660, the TX processor 680, the memory 665, the transceiver 640, etc.) may provide a push notification to an application associated with the push notification. In some aspects, the application processor may receive the push notification via the connection. For example, the connection may be a TCP connection with the server.

Process 1000 may include additional aspects, such as any single aspect or any combination of aspects described below and/or in connection with one or more other processes described elsewhere herein.

In some aspects, the configuration is performed based at least in part on one or more parameters provided to the modem by the application processor, wherein the one or more parameters identify at least one of a periodicity of the periodic communication, a source network address associated with the application, a destination network address associated with the application, a source port number associated with the application, or a destination port number associated with the application.

In some aspects, the one or more parameters include information identifying a payload of the periodic communication, and the periodic communication includes the payload. In some aspects, the information identifying the payload is transparent to the modem. In some aspects, the payload is encrypted.

In some aspects, the application processor may determine that the connection is to be ended, and/or may cause the periodic communication to end so that the connection is ended based at least in part on an inactivity timer. In some aspects, the connection is a single Transport Control Protocol (TCP) connection.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

In some aspects, a UE may receive one or more parameters relating to a periodic communication to maintain a first connection of the UE. The UE may perform the periodic communication based at least in part on the one or more parameters, wherein the periodic communication is performed on a second connection different than the first connection.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   establishing a first connection between a push agent of multiple applications and a remote push server, wherein the first connection is shared by the multiple applications for communicating with one or more respective application servers via the push server;
   configuring one or more parameters for a modem of the UE to transmit keepalive messages to the push server on a second connection, wherein the second connection is different from the first connection; and
   transmitting a keepalive message to the push server on the second connection, based on the one or more parameters, to maintain the first connection without keepalive messages to the one or more respective application servers being transmitted on the first connection.

2. The method of claim 1, wherein the first connection is a Transport Control Protocol (TCP) connection.

3. The method of claim 1, wherein the second connection is a User Datagram Protocol (UDP) connection.

4. The method of claim 1, wherein the one or more parameters are received in a single message.

5. The method of claim 1, further comprising:
receiving a stop request message to end the first connection; and
ceasing the keepalive messages to the push server so that the first connection is ended based at least in part on an inactivity timer.

6. The method of claim 1, wherein the keepalive message to the push server is to prevent lapse of an inactivity timer of the push server for the first connection.

7. The method of claim 1, wherein the one or more parameters include information identifying a payload of the keepalive message to the push server.

8. The method of claim 7, wherein the information identifying the payload is transparent to the modem.

9. The method of claim 7, wherein the payload is encrypted.

10. The method of claim 7, wherein the payload includes information for the push server to provide a keepalive message to an application server of the one or more respective application servers on behalf of an application of the multiple applications.

11. The method of claim 1, wherein the one or more parameters relate to an application of the multiple applications, and wherein the one or more parameters identify at least one of:
a periodicity of the keepalive messages to the push server,
a source network address associated with the application,
a destination network address associated with the application
a source port number associated with the application, or
a destination port number associated with the application.

12. A user equipment (UE), comprising:
a memory; and
one or more processors operatively coupled to the memory, the memory and the one or more processors configured to:
establish a first connection between a push agent of multiple applications and a remote push server, wherein the first connection is shared by the multiple applications for communicating with one or more respective application servers via the push server;
configure one or more parameters for a modem of the UE to transmit keepalive messages to the push server on a second connection, wherein the second connection is different from the first connection; and
transmit a keepalive message to the push server on the second connection, based on the one or more parameters, to maintain the first connection without keepalive messages to the one or more respective application servers being transmitted on the first connection.

13. The modem of claim 12, wherein the first connection is a Transport Control Protocol (TCP) connection and the second connection is a User Datagram Protocol (UDP) connection.

14. The modem of claim 12, wherein the one or more processors are further to:
receive a stop request message to end the first connection; and
cease the keepalive messages to the push server so that the first connection is ended based at least in part on an inactivity timer.

15. The modem of claim 12, wherein the keepalive message to the push server is to prevent lapse of an inactivity timer of the single server for the first connection.

16. The modem of claim 12, wherein the one or more parameters include information identifying a payload of the keepalive message to the push server.

* * * * *